United States Patent
Blumstein et al.

(10) Patent No.: US 8,855,678 B2
(45) Date of Patent: Oct. 7, 2014

(54) SELECTED ACKNOWLEDGMENT POSITIONING OPTIMIZATIONS

(71) Applicant: QUALCOMM Incorporated, San Diego, CA (US)

(72) Inventors: Ronald B. Blumstein, San Jose, CA (US); Yongjin Jiang, San Diego, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 13/744,277

(22) Filed: Jan. 17, 2013

(65) Prior Publication Data

US 2014/0087759 A1     Mar. 27, 2014

Related U.S. Application Data

(60) Provisional application No. 61/706,671, filed on Sep. 27, 2012.

(51) Int. Cl.
| | |
|---|---|
| *H04W 24/00* | (2009.01) |
| *H04W 80/08* | (2009.01) |
| *H04W 4/02* | (2009.01) |
| H04L 29/08 | (2006.01) |
| H04L 12/823 | (2013.01) |

(52) U.S. Cl.
CPC .............. *H04W 4/025* (2013.01); *H04L 67/18* (2013.01); *H04W 80/085* (2013.01); *H04L 47/323* (2013.01); *H04W 4/02* (2013.01)
USPC ...................................................... 455/456.2

(58) Field of Classification Search
USPC ...................................................... 455/456.2
See application file for complete search history.

(56) References Cited

U.S. PATENT DOCUMENTS

| | | |
|---|---|---|
| 7,546,395 B2 | 6/2009 | Yamamoto et al. |
| 2008/0139114 A1* | 6/2008 | Ranganathan ............... 455/41.1 |

(Continued)

FOREIGN PATENT DOCUMENTS

| | | |
|---|---|---|
| EP | 2466778 A1 | 6/2012 |
| WO | 2012060933 A1 | 5/2012 |

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 11)", 3GPP Standard; 3GPP TS 36.355, 3rd Generation Partnership Project (3GPP), Mobile Competence Centre, 650, Route des Lucioles; F-06921 Sophia-Antipolis Cedex, France, vol. RAN WG2, No. V11.0.0, Sep. 21, 2012, pp. 1-117, XP050649759, [retrieved on Sep. 21, 2012] cited in the application pp. 12-13, sections 4.1.2-4.1.4 p. 14, section 4.3.3.1 pp. 18-19, sections 5.2.1 and 5.2.2.

(Continued)

*Primary Examiner* — Joel Ajayi
(74) *Attorney, Agent, or Firm* — Silicon Valley Patent Group LLP (57) ABSTRACT

A location server, such as a Serving Mobile Location Center (SMLC) or E-SMLC and mobile terminal selectively implement the reliable transport mechanism used in, e.g., LPP or LPPe protocols, thereby decreasing unnecessary delays. The reliable transport mechanism may be selectively implemented by not requiring an acknowledgement for specific messages, such as an unsolicited assistance data message. When assistance data is solicited, however, the responsive assistance data message includes an acknowledgement request as per the reliable transport mechanism.

20 Claims, 7 Drawing Sheets

(56) References Cited

U.S. PATENT DOCUMENTS

| | | |
|---|---|---|
| 2009/0253440 A1 | 10/2009 | Edge |
| 2011/0165905 A1* | 7/2011 | Shuman .................. 455/518 |
| 2011/0249623 A1 | 10/2011 | Wachter et al. |
| 2012/0147732 A1 | 6/2012 | Chien et al. |
| 2012/0244852 A1 | 9/2012 | Edge et al. |

OTHER PUBLICATIONS

International Search Report and Written Opinion—PCT/US2013/056653—ISA/EPO—Feb. 19, 2014.

* cited by examiner

Fig. 1

Fig. 2
(Conventional)

Fig. 3

Fig. 4
(Conventional)

SELECTED ACKNOWLEDGMENT POSITIONING OPTIMIZATIONS

CLAIM OF PRIORITY UNDER 35 U.S.C. §119

This application claims under 35 USC §119 the benefit of and priority to U.S. Provisional Application No. 61/706,671, filed Sep. 27, 2012, and entitled "Selected ACK Positioning Optimizations" which is assigned to the assignee hereof and which is incorporated herein by reference.

BACKGROUND

1. Background Field

Embodiments of the subject matter described herein are related generally to generating and transmitting messages containing assistance data, and more particularly to selectively requiring acknowledgement of a message containing assistance data based on whether the message is solicited or unsolicited.

2. Relevant Background

It is often desirable, and sometimes necessary, to know the location of a terminal, e.g., a cellular phone. The terms "location" and "position" are synonymous and are used interchangeably herein. For example, a location services (LCS) client may desire to know the location of the terminal. The terminal (e.g. a User Equipment (UE), a Mobile Station (MS), a Secure User Plane (SUPL) Enabled Terminal (SET), etc.) may then communicate with a location server to obtain a location estimate for the terminal. The terminal or the location server may then return the location estimate to the LCS client.

A message flow (which may also be referred to as a call flow or a procedure) may be executed to establish a location session whenever the LCS client desires to know the location of the terminal. Various messages may be exchanged between the terminal and the location server via one or more network entities for the message flow. These messages may conform to a positioning protocol such as the Long Term Evolution Positioning Protocol (LPP) defined by the $3^{rd}$ Generation Partnership Project (3GPP) or the LPP Extensions (LPPe) protocol being defined by the Open Mobile Alliance (OMA). The messages may transfer assistance data from the location server to the terminal to assist the terminal to obtain location related measurements (e.g. measurements of signals from GPS satellites) and/or to compute a location estimate from these measurements. The messages may also transfer location information (e.g. measurements or a location estimate) from the terminal to the location server to enable the location server to determine the location of the terminal.

SUMMARY

A location server, such as a Serving Mobile Location Center (SMLC) or E-SMLC and mobile terminal selectively implement the reliable transport mechanism used in, e.g., LPP or LPPe protocols, thereby decreasing unnecessary delays. The reliable transport mechanism may be selectively implemented by not requiring an acknowledgement for specific messages, such as an unsolicited assistance data message. When assistance data is solicited, however, the responsive assistance data message includes an acknowledgement request as per the reliable transport mechanism.

In one implementation, a method includes generating a message with a location server in a LPP control plane environment, the message containing assistance data and an acknowledgement request field, wherein the acknowledgement request field indicates acknowledgement is required when the message is solicited by a mobile terminal and the acknowledgement request field indicates that acknowledgement is not required when the message is unsolicited by the mobile terminal; and transmitting the message from the location server to the mobile terminal.

In one implementation, an apparatus includes a transceiver to transfer messages to a mobile device; and a processor connected to the transceiver, the processor adapted to generate a message in an LPP control plane environment, the message containing assistance data and an acknowledgement request field, wherein the acknowledgement request field indicates acknowledgement is required when the message is solicited by a mobile terminal and the acknowledgement request field indicates that acknowledgement is not required when the message is unsolicited by the mobile terminal and to transmit the message to the mobile terminal with the transceiver.

In one implementation, an apparatus includes means for generating a message in a LPP control plane environment, the message containing assistance data and an acknowledgement request field, wherein the acknowledgement request field indicates acknowledgement is required when the message is solicited by a mobile terminal and the acknowledgement request field indicates that acknowledgement is not required when the message is unsolicited by the mobile terminal; and means for transmitting the message to the mobile terminal.

In one implementation, a non-transitory computer-readable medium including program code stored thereon, includes program code to generate a message in a LPP control plane environment, the message containing assistance data and an acknowledgement request field, wherein the acknowledgement request field indicates acknowledgement is required when the message is solicited by a mobile terminal and the acknowledgement request field indicates that acknowledgement is not required when the message is unsolicited by the mobile terminal; and program code to transmit the message to the mobile terminal.

In one implementation, a method includes receiving from a location server an unsolicited message in an LPP control plane environment, the unsolicited message containing assistance data and an acknowledgement request field, wherein the acknowledgement request field indicates that acknowledgement is not required; processing the assistance data contained in the unsolicited message; and awaiting a subsequent message from the location server without transmitting an acknowledgment of the unsolicited message.

In one implementation, an apparatus includes a transceiver to receive and transmit messages to a location server; and a processor connected to the transceiver, the processor adapted to receive with the transceiver an unsolicited message from a location server in an LPP control plane environment, the unsolicited message containing assistance data and an acknowledgement request field, wherein the acknowledgement request field indicates that acknowledgement is not required, process the assistance data contained in the unsolicited message, and await a subsequent message from the location server without transmitting an acknowledgment of the unsolicited message.

In one implementation, an apparatus includes means for receiving from a location server an unsolicited message in an LPP control plane environment, the unsolicited message containing assistance data and an acknowledgement request field, wherein the acknowledgement request field indicates that acknowledgement is not required; means for processing the assistance data contained in the unsolicited message; and means for awaiting a subsequent message from the location server without transmitting an acknowledgment of the unsolicited message.

In one implementation, a non-transitory computer-readable medium including program code stored thereon, includes program code to receive from a location server an unsolicited message in an LPP control plane environment, the unsolicited message containing assistance data and an acknowledgement request field, wherein the acknowledgement request field indicates that acknowledgement is not required; program code to process the assistance data contained in the unsolicited message; and program code to await a subsequent message from the location server without transmitting an acknowledgment of the unsolicited message.

DESCRIPTION

Figure 1:
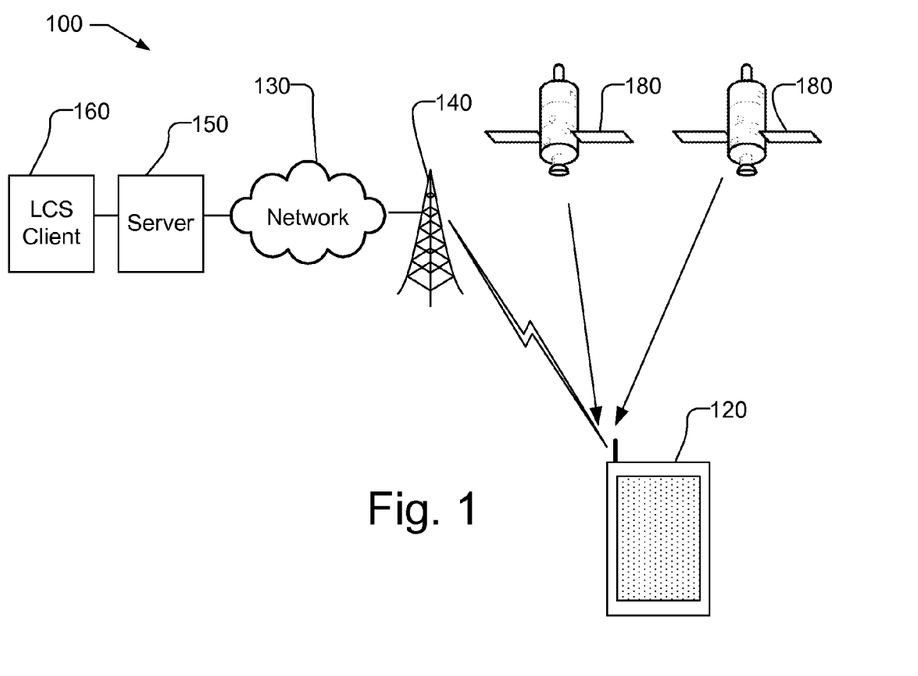
FIG. 1 shows a network architecture capable of a selectively implementing a reliable transport mechanism, such as that used in LPP/LPPe positioning protocols.

FIG. 1 shows a network architecture 100 capable of a selectively implementing a reliable transport mechanism, such as that used in LPP/LPPe, in messages between a mobile terminal 120 (sometimes referred to as a UE, MS, SET, etc. or generally "target") and a location server 150 (sometimes referred to as a server or Serving Mobile Location Center (SMLC) or E-SMLC. The mobile terminal 120 may communicate with the location server 150 through a network 130 using a Radio Access Network (RAN) 140, which is associated with the network 130 for positioning and location services. Mobile terminal 120 may receive and measure signals from RAN 140, which may be used for position determination. Mobile terminal 120 may also receive signals from one or more Earth orbiting satellite vehicles (SVs) 180, which are part of satellite positioning system (SPS). Mobile terminal 120 may measure signals from SVs 180 and/or RANs 140 associated with the network 130 and may obtain pseudo-range measurements for the satellites and network measurements from RANs 140. The pseudo-range measurements and/or or network measurements may be used to derive a position estimate for mobile terminal 120. The location server 150 may be used to provide location related information, such as assistance data, to the mobile terminal 120, which may be used to assist in acquiring and measuring signals from SVs 180 and RANs 140 and/or in deriving a position estimate from these measurements. Additionally, mobile terminal 120 may provide location related information, such as an estimated position or location measurements (e.g., satellite measurements from one or more GNSSs, or network measurements from one or more networks, etc.), to the location server 150.

A mobile terminal as used herein is a device capable of wirelessly communicating with a server through one or more networks and that supports positioning and location services, which may include but is not limited to the Secure User Plane Location (SUPL) location solution defined by OMA and the Control Plane location solution defined by 3GPP for use with an LTE serving network. The SUPL location solution is defined in documents OMA-TS-ULP-V2_0-20110527-C and OMA-TS-ULP-V3_0-20110819-D from OMA which are publicly available. The control plane location solution for LTE is defined in 3GPP TS 23.271 and 3GPP TS 36.305 which are publicly available. Location services (LCS) may be performed on behalf of an LCS Client 160 that accesses location server 150 and issues a request for the location of mobile terminal 120 and receives back from location server 150 a location estimate for mobile terminal 120. LCS Client 160 may also be known as a SUPL Agent—e.g. when the location solution used by location server 150 and mobile terminal 120 is SUPL. Mobile terminal 120 may also include an LCS Client or a SUPL agent (not shown in FIG. 1) that may issue a location request to some positioning capable function within Mobile Terminal 120 and later receive back a location estimate for Mobile Terminal 120. The LCS Client or SUPL Agent within Mobile Terminal 120 may perform location services for the user of Mobile Terminal 120—e.g. provide navigation directions or identify points of interest within the vicinity of mobile terminal 120.

The network architecture 100 may use, e.g., LPP Protocol for positioning. The LPP Protocol is described in 3GPP Technical Specification (TS) 36.355, which is publicly available. LPP elementary messages (Request and Provision of Capabilities and Location Information and Assistance Data) each include a container, an EPDU, which can be used by standardization for outside 3GPP to define their own extensions to LPP messages. OMA LPP Extensions (LPPe) take advantage of this option. LPPe is being defined by OMA and would be used in combination with LPP such that each combined LPP/LPPe message would be an LPP message (as defined in 3GPP TS 36.355) containing an embedded LPPe message. Thus, as used herein LPP control plane environment includes LPPe and may be referred to as LPP/LPPe or simply LPP.

Section 4.3.1 of the LPP standard describes a Reliable Transport Mechanism and states "LPP requires reliable, in-sequence delivery of LPP messages from the underlying transport layers . . . . A UE implementing LPP for the control-plane solution shall support LPP reliable transport (including all three of duplicate detection, acknowledgement, and retransmission)." In order to support the retransmission portion of reliable transport, the standard in section 4.3.4.1 state "[w]hen an LPP message which requires acknowledgement is sent and not acknowledged, it is resent by the sender following a timeout period up to three times." The Reliable Transport procedure requires reliable, in-sequence delivery of LPP messages from the underlying transport layers. Thus, conventional Reliable Transport mechanisms in the control plane of the LPP environment requires that messages are acknowledged and that if a message is not acknowledged, the message is retransmitted by the sender after a timeout period up to three times. When an LPP message which requires acknowledgement is sent and not acknowledged, the message is resent by the sender following a timeout period, up to three times. If after three times, the message is still unacknowledged, the sender will abort all LPP activity for the associated session. The timeout period is determined by the sender implementation but is not less than a minimum value of 250 ms.

Thus, the retransmission requirement has the potential to delay a control plane location session. Under certain situations, location server 150, e.g., a Serving Mobile Location Center (SMLC) or E-SMLC, may send unsolicited Assistance Data information to aid the mobile terminal 120 in a position session. If this unsolicited Assistance Data information is lost and the reliable transport mechanisms are implemented, the session may be needlessly delayed. A delay in the session, is generally undesirable, and may even prevent the completion of the session within the time constraints of an Emergency Services call flow type.

Accordingly, the network architecture 100 is capable of selectively implementing the LPP/LPPe reliable transport mechanism in messages between the mobile terminal 120 and location server 150. The reliable transport mechanism may be selectively performed by not requiring an acknowledgement for specific messages. By way of example, unsolicited assistance data messages may be sent by the location server 150 to the mobile terminal 120 without an acknowledgement request. On the other hand, when assistance data is solicited by the mobile terminal 120, a solicited assistance data message is sent by the location server 150 to the mobile terminal 120 with an acknowledgement request. If desired, an unsolicited error message from the location server 150 may also be sent without an acknowledgement request.

Figure 2:
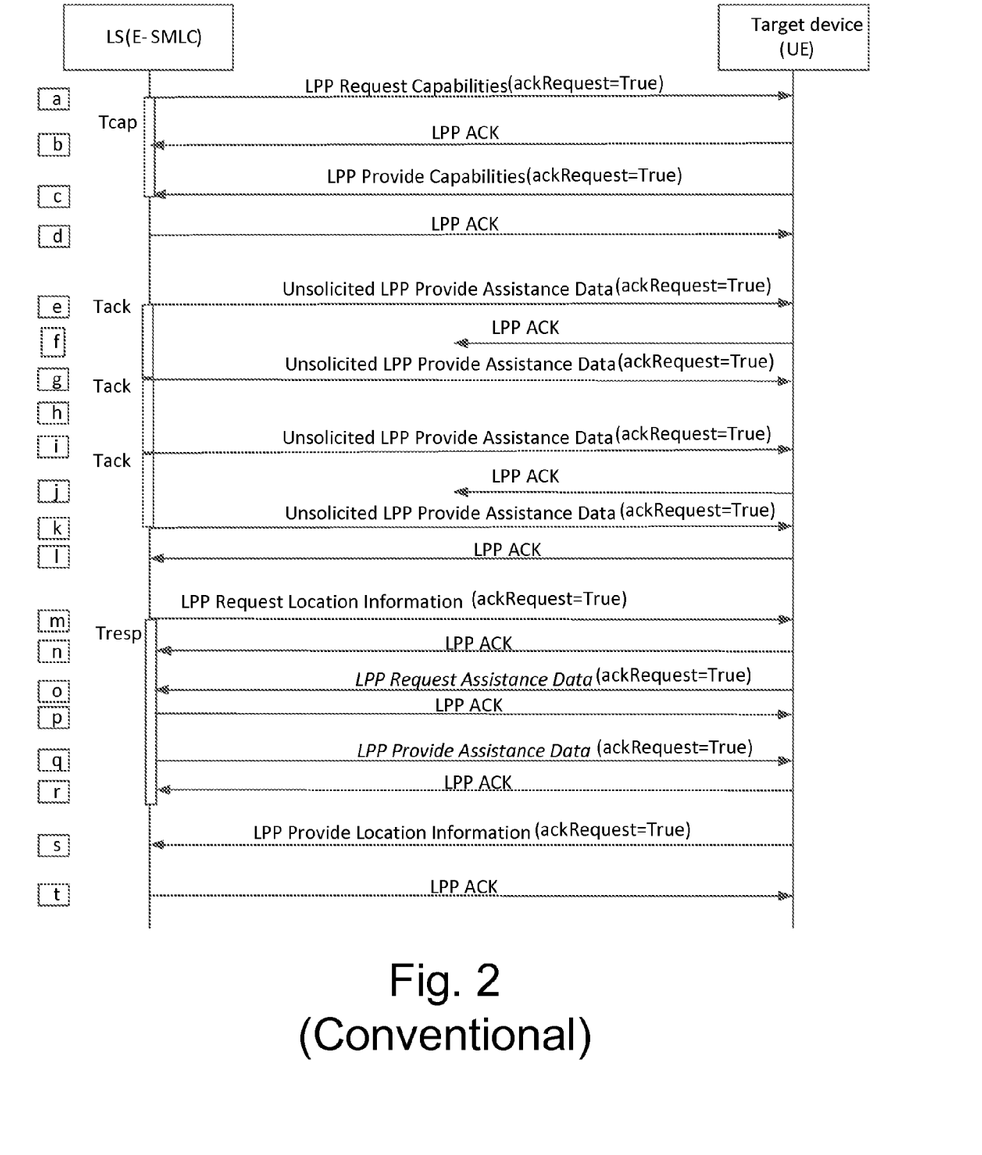
FIG. 2 illustrates a conventional LPP call flow using the reliable transport mechanism to transmit unsolicited assistance data.

FIG. 2, by way of example, illustrates a conventional LPP call flow using the reliable transport mechanism to transmit unsolicited assistance data, e.g., at steps e-l. The call flow of FIG. 2 is described as follows:

Step a: The Location Server (LS) sends an LPP Request Capabilities message that requires acknowledgement to the mobile terminal, i.e., the user equipment (UE). The Location Server also starts the Tcap timer to ensure that it receives the UE Capabilities in a timely manner.

Step b: The UE responds with an explicit acknowledgement.

Step c: The UE provides the LPP Provide Capabilities message.

Step d: The LS stops the Tcap timer, and responds with an explicit acknowledgement.

Step e: The LS sends an unsolicited LPP Provide Assistance Data message. Following the reliable transport procedures, the LS requests acknowledgement and starts the Tack timer.

Step f-k: The UE responds with an explicit acknowledgement which somehow does not reach the LS (steps f, j) or the UE fails to respond with an explicit acknowledgement (step h). In each case, after the expiration of the Tack timer, the LS retransmits the Unsolicited LPP Provide Assistance Data message, e.g., steps g, i, and k.

Step l: The UE responds with an explicit acknowledgement which finally reaches the LS. Although the assistance data is received by the UE, if the ACK in step i also fails to reach the LS, the call flow will have to be aborted unnecessarily at the expiry of Tack.

Step m: The LS sends the LPP Request Information message to the UE.

Step n: The UE responds with an explicit acknowledgement.

Step o: The UE can optionally request additional assistance data if the assistance data provided in steps i, k did not contain sufficient assistance data.

Step p: The LS responds with an explicit acknowledgement.

Step q: The LS sends the solicited LPP Provide Assistance Data message.

Step r: The UE responds with an explicit acknowledgement.

Step s: The UE sends the solicited Provide Location Information message.

Step t: The LS stops the Tresp timer and responds with an explicit acknowledgement.

Thus, as illustrated in FIG. 2, unnecessary delays in the positioning session are added by steps f-l. The unsolicited assistance data message is not a mandatory message in the positioning session. If the unsolicited assistance data message is not received by the UE, the UE has a chance to request missing assistance data in step o. The problem is further compounded by the fact that many UE's may not turn on their GNSS receivers until step m, thus delaying the positioning session even further.

In order to avoid unnecessary delays as described above, a location server 150 may selectively implement the reliable transport mechanism, by setting the acknowledgement request to False when an assistance data message is unsolicited. This also has the effect of disabling the retransmission procedure. It should be understood that this is applicable for both LPP as well as LPPe signaling, which may be sometimes collectively referred to herein as simply LPP or LPP/LPPe. For example, this is applicable to any LPP messages in which the EPDU is used as containers for LPPe payload.

Figure 3:
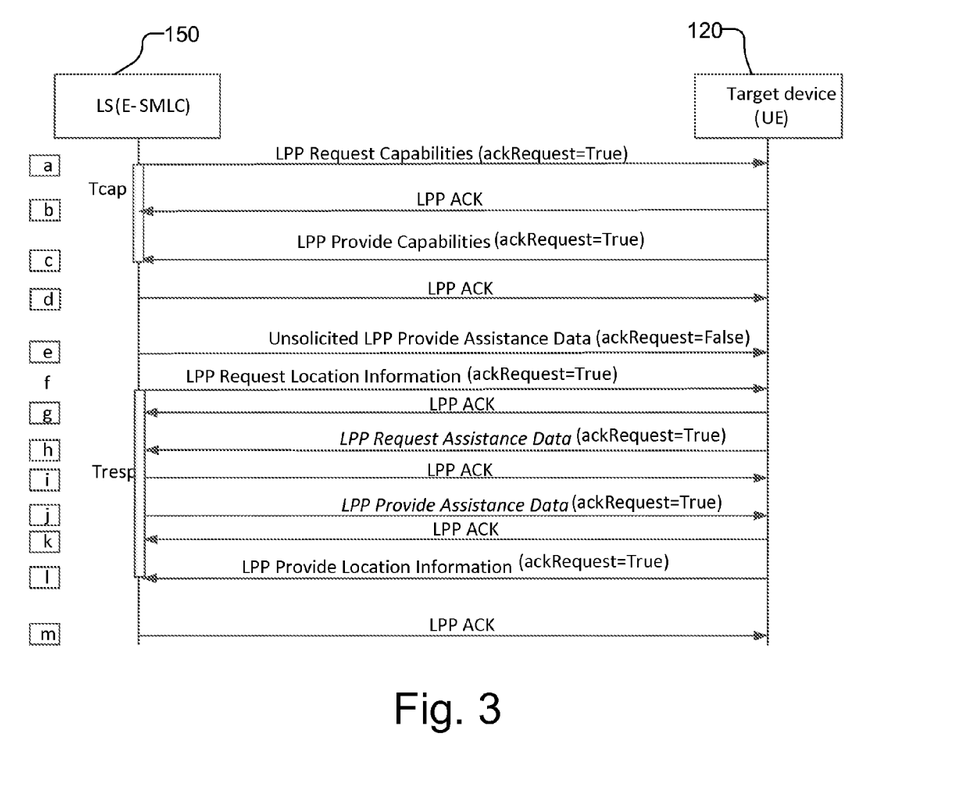
FIG. 3 illustrates an embodiment of an LPP call flow with the reliable transport mechanism selectively implemented in an unsolicited assistance data message.

FIG. 3 illustrates an LPP call flow with the reliable transport mechanism selectively implemented with the location server 150 sending unsolicited assistance data message without requesting an acknowledgement from the mobile terminal 120. After sending the unsolicited assistance data message, the location server 150 may immediately send a LPP Request Location Information message to enable to the UE to begin collecting measurements, thereby avoiding any unnecessary delays. FIG. 3 is described as follows:

Step a: The Location Server (LS) sends an LPP Request Capabilities message that requires acknowledgement to the mobile terminal, i.e., the user equipment (UE), i.e., ackRequest is set to True. The Location Server also starts the Tcap timer to ensure that it receives the UE Capabilities in a timely manner.

Step b: The UE responds with an explicit acknowledgement.

Step c: The UE provides the LPP Provide Capabilities message.

Step d: The LS stops the Tcap timer, and responds with an explicit acknowledgement.

Step e: The LS sends an unsolicited LPP Provide Assistance Data message. In this case, the LS does not follow the reliability transport mechanism and does not request an Acknowledgement, i.e., ackRequest is set to False, or start the Tack response timer.

Step f: The LS sends the LPP Request Information message to the UE without having first received an acknowledgment to the previous message from step e.

Step g: The UE responds with an explicit acknowledgement.

Step h: The UE can optionally request additional assistance data if the assistance data provided in step e did not contain sufficient assistance data.

Step i: The LS responds with an explicit acknowledgement.

Step j: The LS sends the solicited LPP Provide Assistance Data message, with a request for acknowledgement, i.e., ackRequest is set to True.

Step k: The UE responds with an explicit acknowledgement.

Step l: The UE sends the solicited Provide Location Information message.

Step m: The LS stops the Tresp timer and responds with an explicit acknowledgement.

Figure 4:
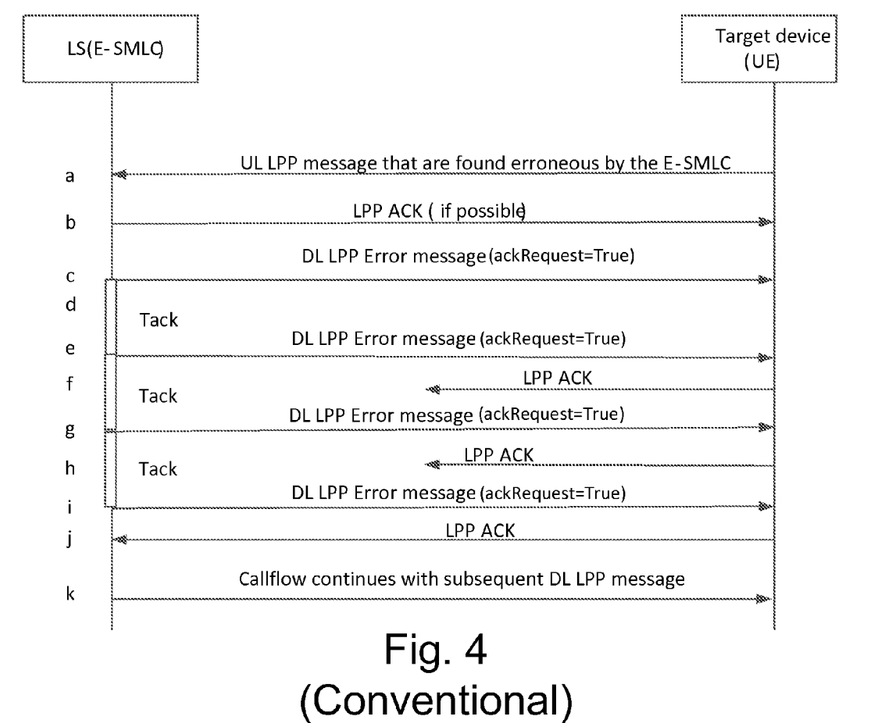
FIG. 4 illustrates a conventional LPP call flow using the reliable transport mechanism to transmit an error message.

If desired, the location server 150 may selectively implement the reliable transport mechanism for other messages, such as error messages, as well. By way of example, FIG. 4 illustrates a conventional LPP call flow using the reliable transport mechanism to transmit an error message at steps c-j. The call flow of FIG. 4 is described as follows:

Step a: The Location Server (LS) receives an uplink LPP message that requires acknowledgement from the mobile terminal, i.e., the user equipment (UE). The Location Server determines that the received message is erroneous (e.g. decoding error, invalid message type, or missing significant IE, etc.)

Step b: The LS responds with an explicit acknowledgement (if possible).

Step c: The LS sends a downlink LPP Error message including the type of error and the request of acknowledgement from the UE, i.e., ackRequest is set to True. The LS starts the Tack timer.

Step d-i: Assuming that the downlink LPP Error message reaches the UE, if the downlink LPP Error message is found erroneous by the UE, the UE may not send an explicit LPP Acknowledgement message (step d); or the explicit LPP Acknowledgement message sent by the UE may get lost due to faulty transport in the network (step f and h). After the expiration of the Tack timer, the LS retransmits the downlink LPP Error message and re-starts the Tack timer (step e, g, and i), up to 3 times. The LS cannot proceed with subsequent LPP messaging on the downlink before an acknowledgement to the LPP Error message is received.

Step j: The UE responds with an explicit acknowledgement which finally reaches the LS. If the acknowledgement in step j also fails to reach the LS, the call flow will have to be aborted at the expiry of Tack, sometimes unnecessarily (e.g. the payload in the erroneous UL LPP message in step a may still be usable for proceeding with the call flow, despite an error in the header).

Step k: Call flow continues with subsequent DL LPP message (if any).

Thus, as illustrated in FIG. 4, unnecessary delays in the positioning session may be added by steps d-i because the explicit acknowledgement on the uplink was not received by the LS.

Figure 5:
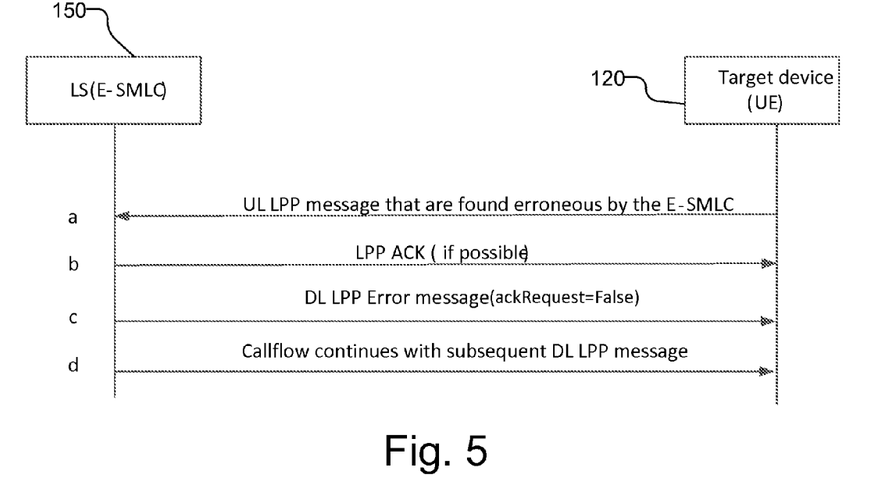
FIG. 5 illustrates an embodiment of an LPP call flow with the reliable transport mechanism selectively implemented in an unsolicited error message.

In order to avoid unnecessary delays as described above, a location server 150 may selectively implement the reliable transport mechanism for an unsolicited error message. FIG. 5 illustrates an LPP call flow selectively implementing the reliable transport mechanism in which the server sends the downlink LPP Error message without requesting an acknowledgement from the UE. The location server 150 can then immediately proceed to send the next downlink LPP message if needed per call flow. FIG. 5 is described as follows:

Step a: The Location Server (LS) receives an uplink LPP message that requires acknowledgement from the mobile terminal, i.e., the user equipment (UE). The location server 150 determines that the received message is erroneous (e.g. decoding error, invalid message type, or missing significant IE, etc.)

Step b: The LS responds with an explicit acknowledgement (if possible).

Step c: The LS sends a downlink LPP Error message including the type of error, however, the LS does not request acknowledgement from the UE, i.e., ackRequest is set to False.

Step d: Call flow continues with subsequent DL LPP message (if any), without requiring an acknowledgement of the previous message from step c.

The downlink LPP Error message from step c (which does not require acknowledgement) may not be received by the UE. If the LPP ACK (step b) is received by the UE, but the downlink LPP Error message is not, and the LPP message in step a requires a response (e.g. LPP Request AD message), some guard-timer on the UE (if it exists) will eventually time out. The UE has to proceed without the requested assistance data. If the LPP message in step a does not require a response (e.g. LPP Provide Location Info message or LPP Provide Capability message), the UE will end the transaction without even being aware of the error in the LPP message in step a. On the LS side, in case the erroneous LPP message in step a is a Provide Capability message, assuming that such error prevents the LS from proceeding to step d (e.g. to send LPP Request Location Info message), the LS will not retransmit step c; therefore the session will eventually fail. On the LS side, in case the erroneous LPP message in step a is a Provide Location Info message, most likely there is no step d in the call flow. If the payload in the Provide Location Info message is not usable, the LS may have to return a cell/sector-based fix to the MME. If the LPP ACK (step b) is not received by the UE, the UE is to retransmits step a upon expiry of the Tack on UE.

Figure 6:
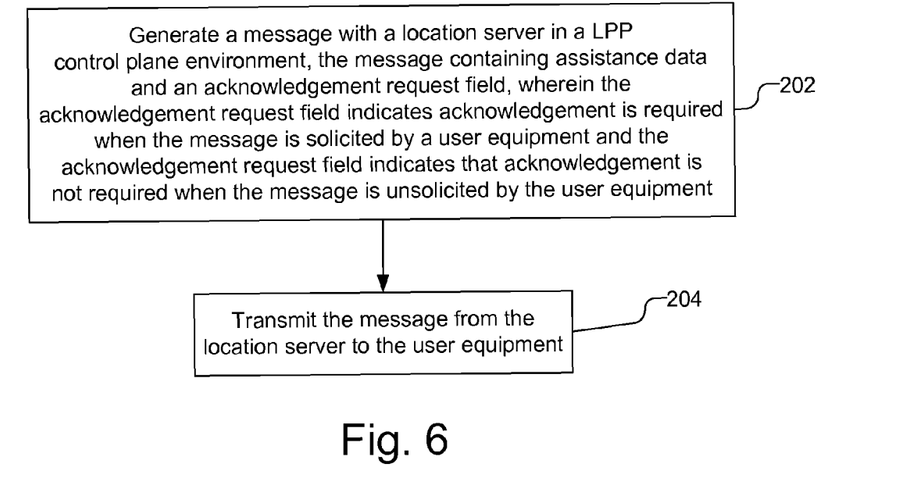
FIG. 6 is a flow chart illustrating a method of selectively implementing the reliable transport mechanism used with LPP/LPPe.

FIG. 6 is a flow chart illustrating a method of selectively implementing the reliable transport mechanism used with LPP/LPPe. As illustrated, a message is generated by a location server in a LPP control plane environment, the message containing assistance data and an acknowledgement request field, wherein the acknowledgement request field indicates acknowledgement is required when the message is solicited by a mobile terminal and the acknowledgement request field indicates that acknowledgement is not required when the message is unsolicited by the mobile terminal (202). The message is transmitted from the location server to the mobile terminal (204). It should be understood that the LPP control plane environment includes LPPe. The message may be segmented into a plurality of message segments, wherein one or more of the message segments of the plurality of message segments contains an acknowledgement request field that indicates acknowledgement is required when the message is solicited by the mobile terminal and indicates that acknowledgement is not required when the message is unsolicited by the mobile terminal. For example, each message segment of the plurality of message segments may include an acknowledgement request field that indicates acknowledgement is required when the message is solicited by the mobile terminal and indicates that acknowledgement is not required when the message is unsolicited by the mobile terminal. In another embodiment, only the last segment of the plurality of message segments may contain the acknowledgement request field. The method may further include sending a subsequent message to the mobile terminal without receiving an acknowledgement message from the mobile terminal. The method may also include generating a second message, which is an error message that contains a second acknowledgement request field that indicates acknowledgement is not required.

Figure 7:
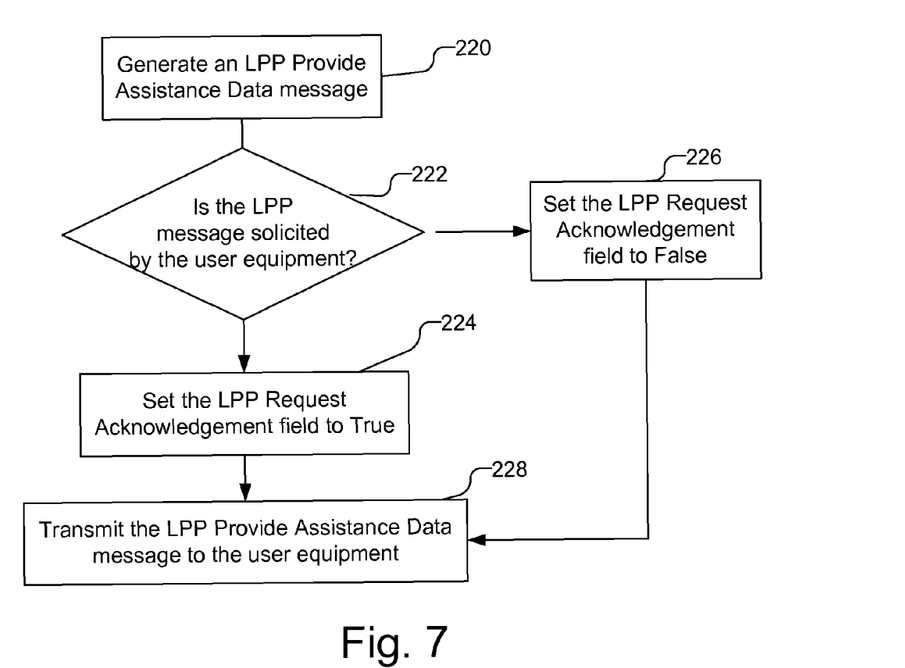
FIG. 7 is another flow chart illustrating the decision point in selectively implementing the reliable transport mechanism used with LPP/LPPe.

FIG. 7 is another flow chart illustrating the decision point in selectively implementing the reliable transport mechanism used with LPP/LPPe. As illustrated, an LPP Provide Assistance Data message is generated by a location server. As illustrated by decision point 222, if the LPP message is solicited by the user equipment, the LPP Request Acknowledgement field is set to True (224), while if the LPP message is not solicited by the user equipment, the LPP Request Acknowledgement field is set to False (226). The LPP Provide Assistance Data message is then transmitted to the user equipment (228).

Figure 8:
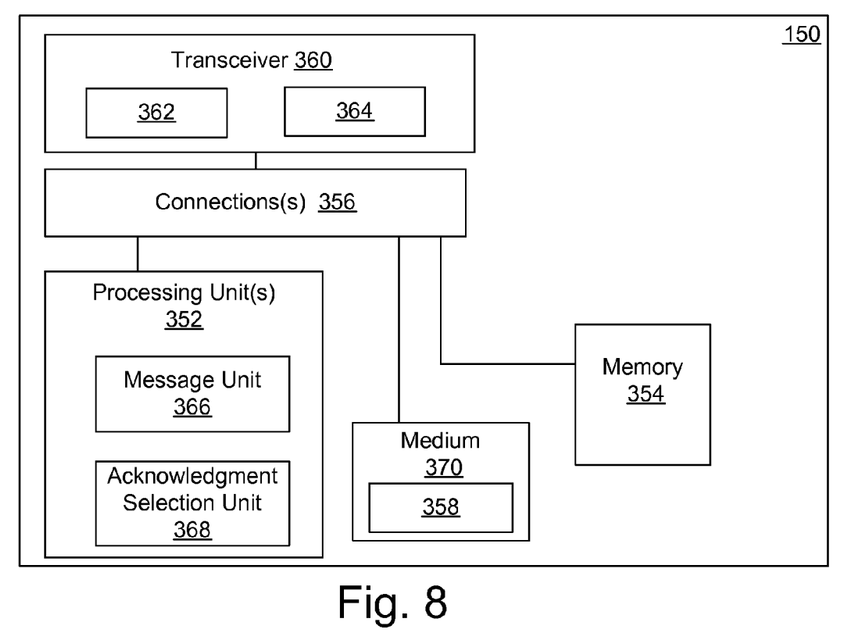
FIG. 8 is a schematic block diagram illustrating certain example features of a location server that selectively implements the LPP/LPPe reliable transport mechanism.

Reference is now made to FIG. 8, which is a schematic block diagram illustrating certain example features of the location server 150, e.g., E-SMLC, that is enabled to avoid unnecessary delays by selectively implementing the LPP/LPPe reliable transport mechanism as discussed above. Location server 150 may, for example, include one or more processing units 352, memory 354, and a transceiver 360 (e.g., wireline or wireless network interface), which may be operatively coupled with one or more connections 356 (e.g., buses, lines, fibers, links, etc.). In certain example implementations, all or part of location server 150 may take the form of a chipset, and/or the like. Transceiver 360 may include a transmitter 362 and a receiver 364 that support wired transmission and/or reception and, if desired, may additionally or alternatively support transmission and reception of one or more signals over one or more types of wireless communication networks.

Processing unit 352 may be implemented using a combination of hardware, firmware, and software. The processing unit 352 may include a message unit 366 which may generate messages, such as an assistance data message, error message, etc., and an acknowledgement selection unit 368 that is used to selectively request an acknowledgement, e.g., by indicating that acknowledgement is not required in the acknowledgement field in unsolicited assistance data messages and error messages. By selecting to indicate that acknowledgement is not required, the location server 150 can selective implement the LPP/LPPe reliable transport mechanism as well as disable the retransmission procedure. The message unit 366 and acknowledgement selection unit 368 may be implemented in hardware, firmware, and software or a combination thereof.

The methodologies described herein in flow charts and message flows may be implemented by various means depending upon the application. For example, these methodologies may be implemented in hardware, firmware, software, or any combination thereof. For a hardware implementation, the processing unit 352 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 370 or memory 354 that is connected to and executed by processor unit 352. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions 358 or code on a non-transitory computer-readable medium, such as computer-readable medium 370 and/or memory 354. Examples include computer-readable media encoded with a data structure and computer-readable media encoded with a computer program. Non-transitory computer-readable media includes physical computer storage media. A storage medium may be any available non-transitory medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined herein. That is, the communication apparatus includes transmission media with signals indicative of information to perform disclosed functions.

Memory 354 may represent any data storage mechanism. Memory 354 may include, for example, a primary memory and/or a secondary memory. Primary memory may include, for example, a random access memory, read only memory, etc. While illustrated in this example as being separate from processing unit 352, it should be understood that all or part of a primary memory may be provided within or otherwise co-located/coupled with processing unit 352. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 370. As such, in certain example implementations, the methods and/or apparatuses presented herein may take the form in whole or part of a computer-readable medium 370 that may include computer implementable instructions 358 stored thereon, which if executed by at least one processing unit 352 may be operatively enabled to perform all or portions of the example operations as described herein. Computer readable medium 370 may be a part of memory 354.

Thus, the location server 150 includes a means for generating a message in a LPP control plane environment, the message containing assistance data and an acknowledgement request field, wherein the acknowledgement request field indicates acknowledgement is required when the message is solicited by a mobile terminal and the acknowledgement request field indicates that acknowledgement is not required when the message is unsolicited by the mobile terminal, which may be, e.g., message unit 366 and acknowledgement selection unit 368. Means for transmitting the message to the mobile terminal may be, e.g., the transceiver 360. The location server 150 may further include means for generating a second message, the second message is an error message and contains a second acknowledgement request field that indicates acknowledgement is not required, which may be, e.g., message unit 366 and acknowledgement selection unit 368. The location server 150 may further include means for sending a subsequent message to the mobile terminal without receiving an acknowledgement message from the mobile terminal, which may include, e.g., the transceiver 360.

Figure 9:
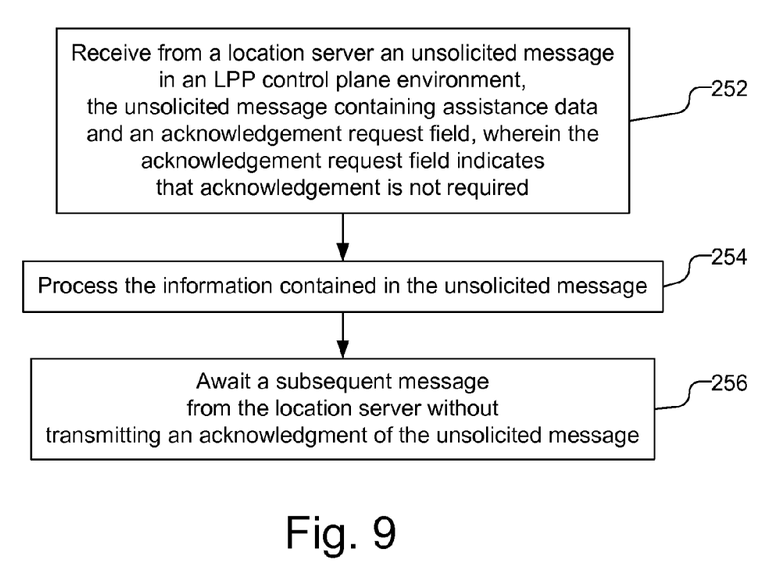
FIG. 9 is a flow chart illustrating a method of the selective implementation of the LPP/LPPe reliable transport mechanism as received by a mobile terminal.

FIG. 9 is a flow chart illustrating a method of the selective implementation of the LPP/LPPe reliable transport mechanism as received by mobile terminal. As illustrated, an unsolicited message is received from a location server in an LPP control plane environment, the unsolicited message contains assistance data and an acknowledgement request field, wherein the acknowledgement request field indicates that acknowledgement is not required (252). The assistance data contained in the unsolicited message is processed (254), and a subsequent message from the locations server is awaited without transmitting an acknowledgment of the message (256). It should be understood that the LPP control plane environment includes LPPe. The message may be segmented into a plurality of message segments, where the last segment of the plurality of message segments contains the acknowledgement request field that indicates that acknowledgement is not required. The method may further include receiving from the location server a second message in the LPP control plane environment, the second message containing a second acknowledgement request field that indicates acknowledgement is required, and acknowledgment of the second message is transmitted to the location server. The method may also include receiving a second message from the location server; the second message is an error message and contains a second acknowledgement request field that indicates acknowledgement is not required.

Figure 10:
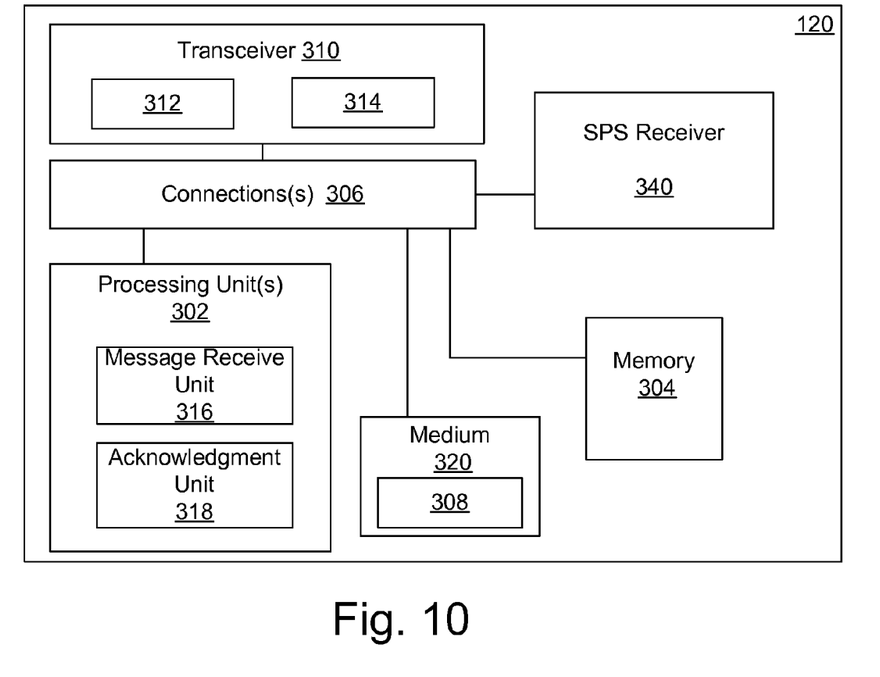
FIG. 10 is a schematic block diagram illustrating certain example features of a mobile terminal that is configured to receive messages from a location server that selectively implements the LPP/LPPe reliable transport mechanism.

FIG. 10 illustrates a schematic block diagram illustrating certain example features of mobile terminal 120, e.g., mobile terminal, that is configured to receive messages from a location server that selectively implements the LPP/LPPe reliable transport mechanism as discussed above, e.g., to avoid unnecessary delays. Mobile terminal 120 may, for example, include one or more processing units 302, memory 304, a transceiver 310 (e.g., wireless network interface), and (as applicable) an SPS receiver 340, which may be operatively coupled with one or more connections 306 (e.g., buses, lines, fibers, links, etc.). In certain example implementations, all or part of mobile terminal 120 may take the form of a chipset, and/or the like.

Transceiver 310 may, for example, include a transmitter 312 enabled to transmit one or more signals over one or more types of wireless communication networks and a receiver 314 to receive one or more signals transmitted over the one or more types of wireless communication networks, e.g., wireless network 130 via RAN 140 in FIG. 1. Wireless communication networks may be wireless wide area networks (WWAN), wireless local area networks (WLAN), a wireless personal area networks (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, RAN1 140 may be, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN.

The SPS receiver 340 may be enabled to receive signals associated with one or more SPS resources, e.g., satellite vehicles (SVs) 180 in FIG. 1. The SVs, for example, may be in a constellation of Global Navigation Satellite System (GNSS) such as Global Positioning System (GPS), Galileo, Glonass or Compass. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou or Compass over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Processing unit 302 may be implemented using a combination of hardware, firmware, and software. The processing unit 302 may represent one or more circuits configurable to perform at least a portion of a data signal computing procedure or process related to the operation of motile terminal 120. The processing unit 352 may include a message receive unit 316 that, e.g., processes data received in messages and an acknowledgement unit 318 that generates an acknowledgement message in response to a request for acknowledgement in a received message. The message receive unit 316 and acknowledgement unit 318 may be implemented in hardware, firmware, and software or a combination thereof.

The methodologies described herein in flow charts and message flows may be implemented by various means depending upon the application. For example, these methodologies may be implemented in hardware, firmware, software, or any combination thereof. For a hardware implementation, the processing unit 302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 320 or memory 304 that is connected to and executed by processor unit 302. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions 308 or code on a non-transitory computer-readable medium, such as computer-readable medium 320 and/or memory 304. Examples include computer-readable media encoded with a data structure and computer-readable media encoded with a computer program. Non-transitory computer-readable media includes physical computer storage media. A storage medium may be any available non-transitory medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 304 may represent any data storage mechanism. Memory 304 may include, for example, a primary memory and/or a secondary memory. Primary memory may include, for example, a random access memory, read only memory, etc. While illustrated in this example as being separate from processing unit 302, it should be understood that all or part of a primary memory may be provided within or otherwise co-located/coupled with processing unit 302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 320. As such, in certain example implementations, the methods and/or apparatuses presented herein may take the form in whole or part of a computer-readable medium 320 that may include computer implementable instructions 308 stored thereon, which if executed by at least one processing unit 302 may be operatively enabled to perform all or portions of the example operations as described herein. Computer readable medium 320 may be a part of memory 304.

Thus, the mobile terminal 120 may include means for receiving from a location server an unsolicited message in an LPP control plane environment, the unsolicited message containing assistance data and an acknowledgement request field, wherein the acknowledgement request field indicates that acknowledgement is not required, which may be, e.g., the transceiver 310. The mobile terminal 120 may further include means for processing the assistance data contained in the unsolicited message, which may be, e.g., the message receive unit 316. A means for awaiting a subsequent message from the location server without transmitting an acknowledgment of the unsolicited message, may include, e.g., the acknowledgement unit 318. The mobile terminal 120 may further include means for receiving a second message from the location server, wherein the second message is an error message and contains a second acknowledgement request field that indicates acknowledgement is not required, which may be, e.g., the transceiver 310. A means for receiving from the location server a second message in the LPP control plane environment, the second message contains a second acknowledgement request field that indicates acknowledgement is required may be, e.g., the transceiver 310 and a means for transmitting an acknowledgment of the second message to the location server may include the acknowledgement unit 318 and the transceiver 310.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
generating a message with a location server in a Long Term Evolution Positioning Protocol (LPP) control plane environment, the message containing assistance data and an acknowledgement request field;
determining whether the message is solicited by a mobile terminal;
setting the acknowledgement request field in the message to indicate acknowledgement is required when the message is solicited by a mobile terminal and to indicate acknowledgement is not required when the message is unsolicited by the mobile terminal; and
transmitting the message from the location server to the mobile terminal.

2. The method of claim 1, wherein the message is segmented into a plurality of message segments and wherein a last segment of the plurality of message segments contains the acknowledgement request field that indicates acknowledgement is required when the message is solicited by the mobile terminal and indicates that acknowledgement is not required when the message is unsolicited by the mobile terminal.

3. The method of claim 1, further comprising generating a second message, wherein the second message is an error message and contains a second acknowledgement request field that indicates acknowledgement is not required.

4. The method of claim 1, further comprising sending a subsequent message to the mobile terminal without receiving an acknowledgement message from the mobile terminal.

5. The method of claim 1, wherein the LPP control plane environment includes LPP Extensions protocol (LPPe).

6. An apparatus comprising:
a transceiver to transfer messages to a mobile device; and
a processor connected to the transceiver, the processor adapted to generate a message in a Long Term Evolution Positioning Protocol (LPP) control plane environment, the message containing assistance data and an acknowledgement request field, determine whether the message is solicited by a mobile terminal, set the acknowledgement request field in the message to indicate acknowledgement is required when the message is solicited by the mobile terminal and to indicate acknowledgement is not required when the message is unsolicited by the mobile terminal and to transmit the message to the mobile terminal with the transceiver.

7. The apparatus of claim 6, wherein the message is segmented into a plurality of message segments and wherein one or more of the message segments of the plurality of message segments contains the acknowledgement request field that indicates acknowledgement is required when the message is solicited by the mobile terminal and indicates that acknowledgement is not required when the message is unsolicited by the mobile terminal.

8. The apparatus of claim 6, wherein the processor is further adapted to generate a second message, wherein the second message is an error message and contains a second acknowledgement request field that indicates acknowledgement is not required and to transmit the second message to the mobile terminal with the transceiver.

9. The apparatus of claim 6, wherein the processor is further adapted to generate a second message and to transmit the second message to the mobile terminal with the transceiver without receipt of an acknowledgement message from the mobile terminal.

10. The apparatus of claim 6, wherein the LPP control plane environment includes LPP Extensions protocol (LPPe).

11. An apparatus comprising:
means for generating a message in a Long Term Evolution Positioning Protocol (LPP) control plane environment, the message containing assistance data and an acknowledgement request field;
means for determining whether the message is solicited by a mobile terminal;
means for setting the acknowledgement request field in the message to indicate acknowledgement is required when the message is solicited by the mobile terminal and to indicate acknowledgement is not required when the message is unsolicited by the mobile terminal; and
means for transmitting the message to the mobile terminal.

12. The apparatus of claim 11, wherein the message is segmented into a plurality of message segments and wherein one or more of the message segments of the plurality of message segments contains the acknowledgement request field that indicates acknowledgement is required when the message is solicited by the mobile terminal and indicates that acknowledgement is not required when the message is unsolicited by the mobile terminal.

13. The apparatus of claim 11, further comprising means for generating a second message, wherein the second message is an error message and contains a second acknowledgement request field that indicates acknowledgement is not required.

14. The apparatus of claim 11, further comprising means for sending a subsequent message to the mobile terminal without receiving an acknowledgement message from the mobile terminal.

15. The apparatus of claim 11, wherein the LPP control plane environment includes LPP Extensions protocol (LPPe).

16. A non-transitory computer-readable medium including program code stored thereon, comprising:
program code to generate a message in a Long Term Evolution Positioning Protocol (LPP) control plane environment, the message containing assistance data and an acknowledgement request field;
program code to determine whether the message is solicited by a mobile terminal;
program code to set the acknowledgement request field in the message to indicate acknowledgement is required when the message is solicited by the mobile terminal and to indicate acknowledgement is not required when the message is unsolicited by the mobile terminal; and
program code to transmit the message to the mobile terminal.

17. The non-transitory computer-readable medium of claim 16, wherein the message is segmented into a plurality of message segments and wherein one or more of the message segments of the plurality of message segments contains the acknowledgement request field that indicates acknowledgement is required when the message is solicited by the mobile terminal and indicates that acknowledgement is not required when the message is unsolicited by the mobile terminal.

18. The non-transitory computer-readable medium of claim 16, further comprising program code to generate a second message, wherein the second message is an error message and contains a second acknowledgement request field that indicates acknowledgement is not required.

19. The non-transitory computer-readable medium of claim 16, further comprising program code to send a subsequent message to the mobile terminal without receiving an acknowledgement message from the mobile terminal.

20. The non-transitory computer-readable medium of claim 16, wherein the LPP control plane environment includes LPP Extensions protocol (LPPe).

* * * * *